Dec. 15, 1942.  H. B. KORWAN  2,304,833
METHOD OF ASSEMBLING AND HERMETICALLY SEALING FRICTION CAN PARTS
Filed Aug. 4, 1939  2 Sheets-Sheet 1
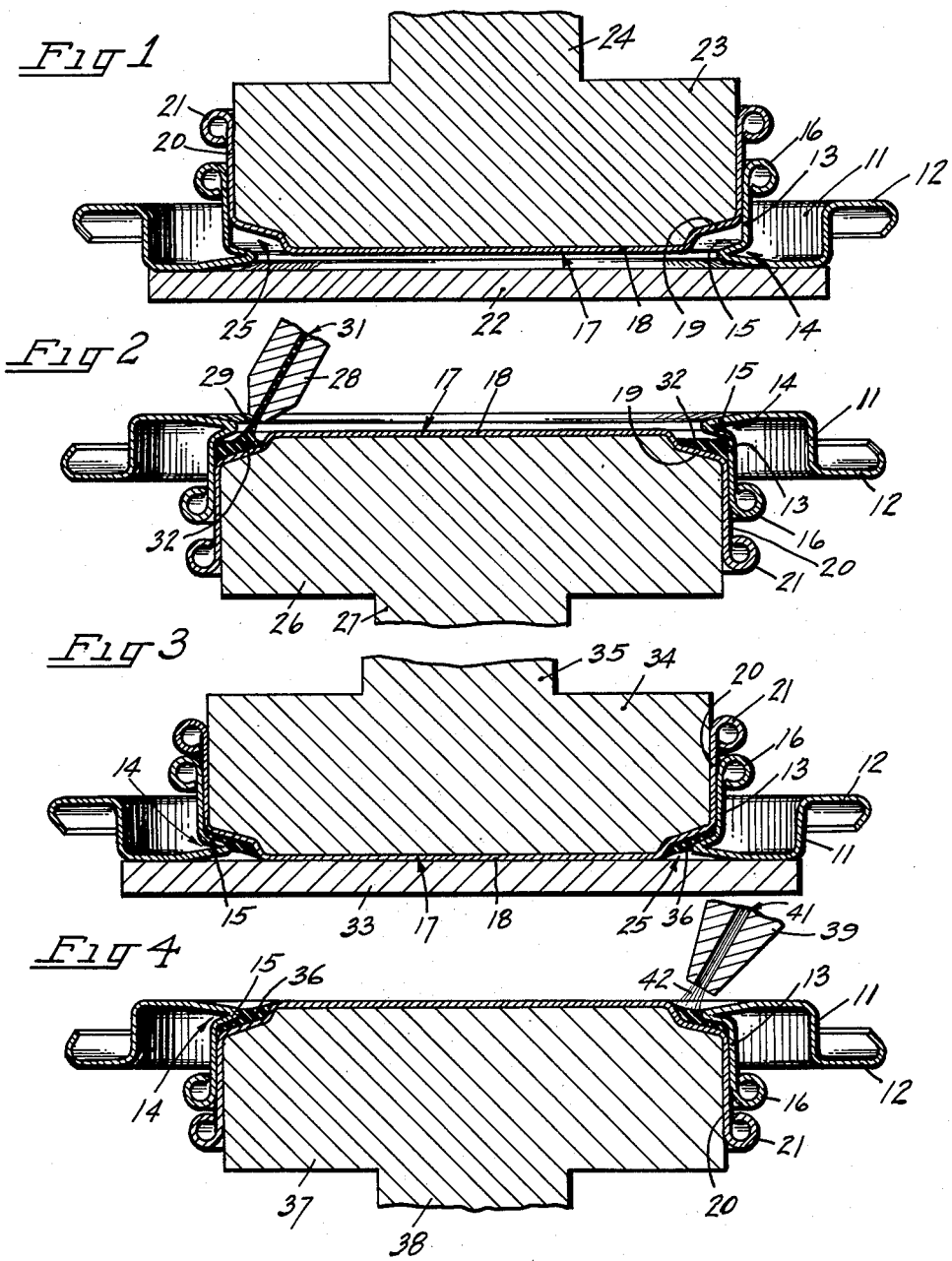
INVENTOR
Henry B. Korwan
BY
ATTORNEY Dec. 15, 1942.   H. B. KORWAN   2,304,833
METHOD OF ASSEMBLING AND HERMETICALLY SEALING FRICTION CAN PARTS
Filed Aug. 4, 1939   2 Sheets-Sheet 2
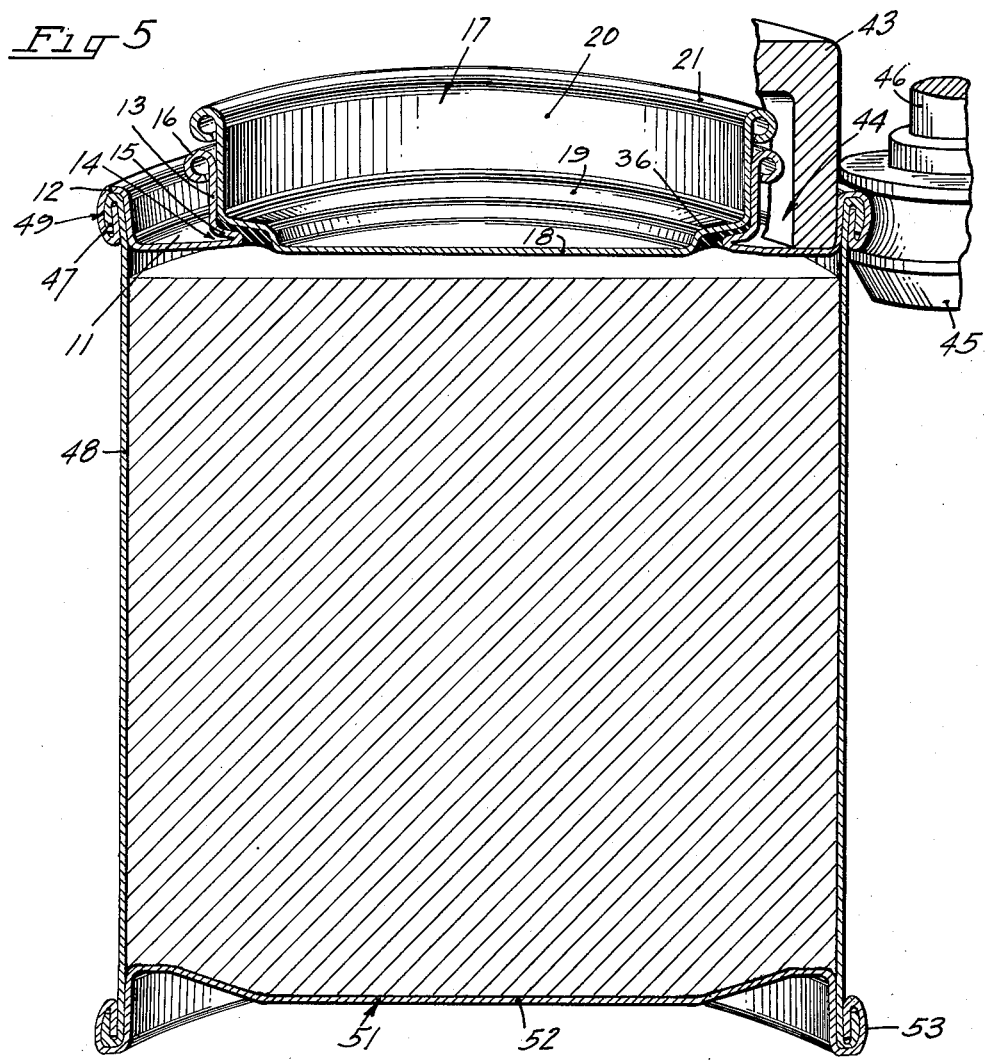
INVENTOR.
Henry B. Korwan
BY Ivan D. Thornburgh
Charles H. Cinq
ATTORNEY.

Patented Dec. 15, 1942

2,304,833

UNITED STATES PATENT OFFICE 2,304,833

METHOD OF ASSEMBLING AND HERMETICALLY SEALING FRICTION CAN PARTS

Henry B. Korwan, Brooklyn, N. Y., assignor to American Can Company, New York, N. Y., a corporation of New Jersey Application August 4, 1939, Serial No. 288,470

2 Claims. (Cl. 113—121)

The present invention relates to the method of applying a sealing compound to partially assembled friction can parts and to hermetically sealing the can parts when they are fully assembled.

An object of the present invention is the provision of a method of making a hermetically sealed friction can closure formed of a friction ring member and a friction plug member, in which these parts are partially assembled so as to leave a channel space between the parts, into which a sealing compound is flowed prior to finally assembling the members by pressing them together.

Another object of the invention is the novel application, in such a method, of the elastic sealing material or compound preferably applied in a fluid state into the annular groove between shoulders of the plug and ring, such a groove being formed by partial assembly of the parts, that is by inserting the plug into the ring in a light press fit, the filling of the groove with compound to the desired level being effected while the plug and ring are in an inverted position, the gasket lining steps being then followed by pressing the plug into its final and fully seated position in the ring member and with the gasket mass squeezed in and shaped to fully fit its engaged parts and thereafter subjecting the assembled and lined unit to a drying operation which fully sets the sealing material leaving it in an elastic state, thereby effecting a hermetically sealed joint.

A further object of the invention is the provision of a method of the character described, which comprises handling the assembled plug and ring unit as a single end member which is finally attached to a can body by the usual double or other suitable seam the hermetic character of the joint of such a single end member permitting sealing of the can while it is subjected to a vacuum or to gas during the sealing operation.

Numerous other objects and advantages of the invention will be apparent as it is better understood from the following description, which taken in connection with the accompanying drawings, discloses a preferred embodiment thereof.

Referring to the drawings:

Figure 1 is a fragmentary sectional view of a portion of a mechanism for assembling a friction plug into a friction ring, prior to attachment to a can body and exemplifying one of the steps of the present invention;

Fig. 2 shows a further step being a sectional view of the assembled friction members of Figure 1 in an inverted position with parts of a compound lining machine illustrating the application of the sealing material into the annular groove between the members;

Fig. 3 is a fragmentary sectional view of portions of mechanism similar to that shown in Figure 1 and showing the friction plug fully seated in the friction ring and compressing the interposed sealing material;

Fig. 4 is a sectional view of the assembled friction members illustrating the drying of the sealing material; and Fig. 5 is a fragmentary, perspective, sectional view of can and assembled cover parts, showing portions of a double seaming mechanism and exemplifying the uniting of the assembled cover parts with its filled can.

One of the friction cover parts of a can made according to the present invention constitutes a friction ring 11 (Fig. 1) provided with an outwardly extending flange 12 and an inner cylindrical friction wall 13. At the base of the wall 13, is an inwardly extending bead 14 which is V shape in cross section, the innermost diameter of the bead being considerably smaller than the wall. This leaves a ledge or shoulder 15 at the base of the friction wall 13, the latter extending upwardly and terminating in an outwardly rolled rim or curl 16.

The friction plug of the cover part designated by the numeral 17 is formed with a centrally disposed countersunk panel 18 bounded by an annular stepped shoulder 19 sloping outwardly and upwardly relative to the plane of the panel. An upstanding cylindrical friction wall 20 merges into the shouldered wall 19 and its outer edge terminates in a rim curl 21.

In the initial assembly of the cover parts (Fig. 1) according to the present invention, the friction ring 11 is placed upon a support plate or member 22 and the plug 17 is then brought into inserting position. The plug may be carried on a pressure head 23. The pressure head may be moved toward the support plate in any suitable manner being carried on a stem 24. The plug is only partially inserted into the friction ring the desired position leaving an annular groove 25 between the shoulders 15 and 19, as best illustrated by Fig. 1 of the drawings.

The partially assembled friction cover parts are now inverted and placed upon a supporting chuck 26 (Fig. 2) which may be a part of a compound lining machine. The chuck is a part of a stem 27 and is rotated in any suitable manner. A lining nozzle 28 may be used to deposit lining compound 29 drawn from any suitable source of supply and projected through a passageway 31 formed centrally of the nozzle 28. The nozzle 28 is preferably held stationary and as the chuck with its friction plug and ring rotates the entire annular extent of the groove 25 moves beneath the discharge opening of the nozzle.

A fluid compound 32 is thus deposited in the groove. The compound 32 may be one of the conventional can end lining compounds known in the can manufacturing art and will be determined by the particular product put in the can or for which the latter is designed.

The lined friction cover parts are then fully assembled into their final positions relative to one another by other pressure closing members suitably mounted and operated, as illustrated in Fig. 3. This assembling mechanism may constitute a support plate or member 33 and a pressure head 34 between which the parts are forced further together. The head enters the plug 17, as in previous operations, properly centering and holding the parts square on the support plate. The proper movement of the head may be had through a stem 35. The annular groove 14 in the ring member 11 provides necessary yielding space as the friction parts are pressed together. It will be understood that the compound gasket, marked 36, is only semi-liquid at this time and is set sufficiently so that it will not run out of the groove. This final assembling action compressing the compound 36 causing it to flow and substantially fill the annular groove 25.

The cover parts are again inverted and placed upon a supporting chuck 37 (Fig. 4) of a suitable compound drying machine. The chuck is rotated by a stem 38, in any suitable manner. A drying nozzle 39 is held stationary as the chuck rotates with the assembled friction parts supported thereupon. The nozzle 39 is provided with a central passageway 41 through which warm air or other suitable drying medium 42 may be directed under pressure upon the compound 36 in the cover groove 25 as it passes therebeneath. This jet of hot air or other drying medium causes the volatile solvents in the compound to evaporate, thereby changing it preferably into a semiplastic and slightly elastic state.

The completed friction cover parts can now be handled as a single can end and in order that the invention may be better understood, reference is made to Fig. 5 of the drawings showing the composite end being applied as the final cover end after the can has been filled with its contents. Obviously the composite end could be used as a bottom end for a can before filling.

The essential parts of the seaming mechanism (Fig. 5) necessary to exemplify this step, comprise a chuck 43 which is relieved as at 44 to clear the assembled cover parts when the chuck is in its conventional seaming position within the friction ring 11. The usual double seaming roller is designated 45 and rotates upon a spindle 46. The annular flange 12 of the friction ring 11 and a flange 47 on a can body 48 of the can is thus interfolded into a double seam 49.

The bottom end of the can is designated by the numeral 51 and is shown as being paneled as at 52. Such a contour permits stacking of one can on top of another and allows for nesting engagement of the rim curl 21 of the plug cover 17 within the panel portion of the bottom 51. This bottom end is attached to the can body by a conventional interfolded double seam joint 53.

The composite friction cover parts being united in a hermetic joint, such a double cover may be used in a variety of places and for numerous products. Obvious a can closed with such a cover could not stand extreme internal pressures but within limits products exerting some internal pressure may be safely held. Such a can, therefore, lends itself to vacuumizing and gassing during closing. Liquids, powders, pastes and even solid material may be held in this improved closure can. The described method of forming a hermetic friction can end may be used in canning paint which can be sealed under vacuum and paint so packaged is found to keep in much better condition than when closed in the ordinary friction closure can.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of making a hermetically sealed composite two-part friction can end consisting solely of a friction ring member and a friction plug member each having a downwardly and inwardly inclined wall portion for defining an open annular channel therebetween, which comprises initially and partially assembling said ring and plug members in an axial direction into telescoping relation to define said open channel between said wall portions, positioning said members with said channel between said members closed at its bottom and open at its top, flowing a fluid sealing compound downwardly into and around said channel, and thereafter finally assembling the members by forcing the same completely together in the same axial direction to squeeze the compound into tight engagement with the said wall portions of said friction ring and plug members to constitute a hermetic seal between the members.

2. The method of making a hermetically sealed composite two-part friction can end consisting solely of a friction ring member and a friction plug member each having a downwardly and inwardly inclined wall portion for defining an open annular channel therebetween, which comprises initially and partially assembling said ring and plug members in an axial direction into telescoping relation to define said open channel between said wall portions, positioning said members with said channel between said members closed at its bottom and open at its top, then flowing a fluid sealing compound downwardly into and around said channel, thereafter finally assembling the members by forcing the same completely together in the same axial direction to squeeze the compound into tight engagement with the said wall portions of said friction ring and plug members, and thereafter drying said fluid compound to reduce it to a semi-plastic state constituting a hermetic seal between said friction ring and plug members.

HENRY B. KORWAN.